Aug. 15, 1972  D. V. LOUZOS  3,684,480
NICKEL FIBERS USEFUL FOR GALVANIC CELL ELECTRODES
Filed April 3, 1970  3 Sheets-Sheet 1
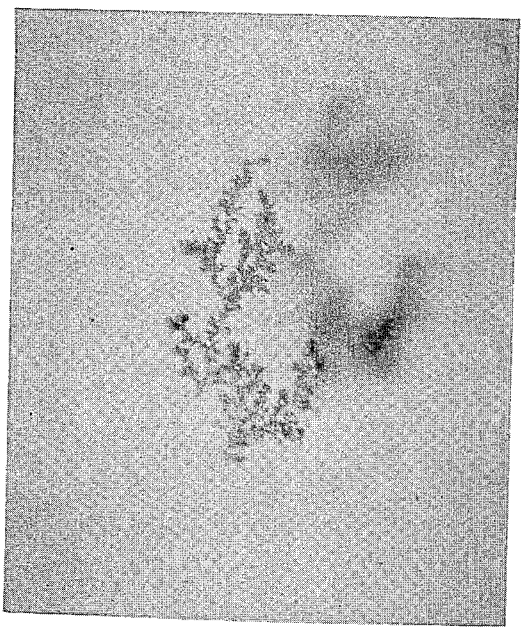
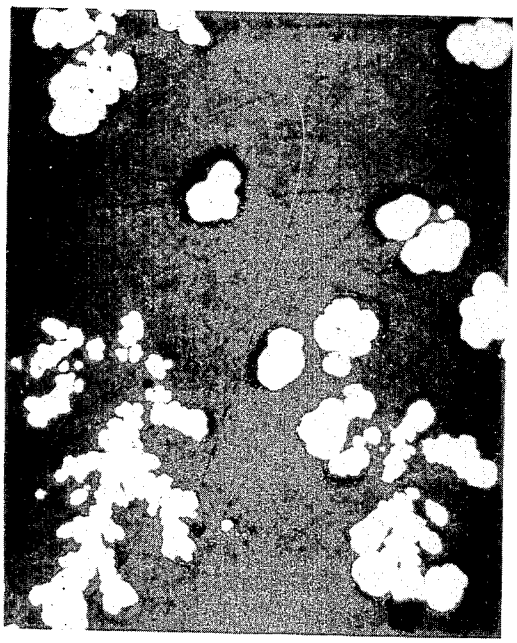
FIG. 2.
INVENTOR.
Demetrios V. Louzos
BY
ATTORNEY INVENTOR.
Demetrios V. Louzos

United States Patent Office

3,684,480
Patented Aug. 15, 1972

3,684,480
NICKEL FIBERS USEFUL FOR GALVANIC
CELL ELECTRODES
Demetrois V. Louzos, Rocky River, Ohio, assignor to
Union Carbide Corporation, New York, N.Y.
Filed Apr. 3, 1970, Ser. No. 25,489
Int. Cl. B22f 1/00
U.S. Cl. 75—.5 R          1 Claim

ABSTRACT OF THE DISCLOSURE

Stable, high surface area nickel fibers composed of a single elongated chain of small, interconnected, nearly perfect spheres. The nickel fibers are prepared by the electrolysis of a soluble nickel salt-containing electrolyte solution under conditions of extremely high cathode current density. Galvanic cell electrodes are fabricated using the nickel fibers by compression molding techniques.

---

This invention relates to novel nickel fibers and to a process for their preparation. In one aspect, the invention relates to galvanic cell electrodes fabricated from the novel nickel fibers and to the use of these electrodes in both primary and secondary alkaline galvanic cells and especially secondary or rechargeable cells of the nickel-cadmium type.

BACKGROUND OF THE INVENTION

Rechargeable alkaline galvanic cells of the nickel-cadmium type have been known for many years now. Generally these cells comprise a rechargeable cadmium anode, a nickel oxide cathode and an alkaline electrolyte such as an aqueous solution of potassium hydroxide. One of the principal requirements of high rate rechargeable nickel-cadmium cells is that the electrodes possess a high active surface area in order to obtain satisfactory high rate discharge.

Prior art rechargeable nickel-oxide cathodes have been made during the last decade or so by impregnating a sintered metal plaque of high porosity with a nickel salt solution, suitably a solution of nickel nitrate, and then precipitating the metal within the pores of the plaque by cathodic polarization in an alkaline bath. During this procedure which is described in detail by A. Fleischer, Journal of the Electrochemical Society, vol. 94, pp. 289–295 (1948), the sintered metal plaque is first placed under vacuum and then soaked in the nickel salt solution for a period of about five minutes. Air is then admitted and the excess solution is drained. The impregnated plaque is then given a cathodic polarization treatment in an alkaline bath and then washed and dried. The procedure must be repeated several times or more in order to introduce the required amount of active material within the pores of the plaque.

Although rechargeable nickel oxide cathodes made by the prior art methods outlined above generally fulfill the requirement of high rate discharge, the procedure for fabricating the electrodes is very time consuming and consequently the manufacturing cost is high. Another difficulty resides in the fact that the sintered metal plaques which are made from an electrochemically inert metal, e.g., nickel, serves mainly as a support for the active material, performing no useful electrochemical function, and thus limit the energy output per unit weight capabilities of the electrode. Still another disadvantage is the fact that these rechargeable nickel-oxide cathodes once fabricated must be subjected to formation cycling, i.e., repeated charge and discharge in an alkaline electrolyte, in order to provide the desired capacity in the electrodes before assembly into a sealed cell.

SUMMARY OF THE INVENTION

The invention contemplates the provision of novel nickel fibers possessing certain properties which make them ideal for use in fabricating galvanic cell electrodes. The nickel fibers of the invention are quite readily distinguishable in physical appearance from other forms of nickel material heretofore known in the art. The nickel fibers of the invention may be basically described as fibers composed of a single elongated chain or cluster of small, interconnected nearly perfect spheres. The nickel fibers may also include a number of side growths, each having the same basic structure as the main fiber, i.e., each consisting of a single chain or cluster of small, interconnected spheres.

The novel nickel fibers of the invention are primarily characterized by their stability, purity and high surface area. The nickel fibers are stable in that they do not rapidly oxidize upon exposure to the atmosphere. The specific surface area of the nickel fibers is about 1.67 square meters per gram. The length of the nickel fibers measured along the chain or cluster of interconnected spheres may vary from relatively short fibers of about one-thirtieth of an inch to long fibers of about one-eighth of an inch in length. The average diameter or width of the fibers measured across the chain or cluster of interconnected spheres is about one-thousandth of an inch.

In the practice of the invention, the novel nickel fibers are prepared by the electrolysis of a soluble nickel salt-containing electrolyte under conditions of extremely high cathode current density. Generally, the cathode current density should be at least about 500 amperes per square foot.

The process for preparing the novel nickel fibers of the invention may be carried out at about room temperature in a typical electrolysis cell using a nickel anode and a thin wire cathode suspended in the electrolyte bath. The fibers electroform at the cathode and may be broken off and collected at the bottom of the bath, or if the fibers are not removed and the electrolysis is allowed to proceed, the fibers tend to electrodeposit in the form of an interconnected skeletal nickel fibrous mat. This interconnected skeletal fibrous mat consists basically of multiple fibers joined to one or more neighboring fibers throughout the mat. By the term "electroform" or "electroformation" as used herein is meant the production of nickel fibers by electrodeposition.

Galvanic cell electrodes can be readily fabricated from the novel nickel fibers using conventional compression molding techniques. The novel nickel fibers prepared as described above are placed within the mold and then compression molded to form an electrode compact of the desired size and configuration. In forming the compact, the interconnected skeletal nickel fibrous mats are preferably used. If the individual nickel fibers are used, it is essential that they should be thoroughly intermingled when placed within the mold. When compression is applied, the fibers readily interlock or interknit producing a highly cohesive electrode body which is capable of supporting its own weight and retaining the shape in which it is molded.

The galvanic cell electrodes so prepared can be advantageously used as cathodes in secondary or rechargeable alkaline nickel-cadmium cells. The rechargeable cathodes prepared from the nickel fibers are in the discharged condition at the time of fabrication and can be placed in the charged condition by formation cycling as mentioned above. Most advantageously, however, the rechargeable cathodes are placed in the charged condition by electro-oxidizing the surface portions of the nickel fibers to the required nickel oxide state.

The principal advantages of the rechargeable cathodes fabricated in accordance with the invention are that they are self-supporting and can be fabricated without the need for an electrochemically inert support for the active material and, further, that the cathodes afford a very high active surface area for satisfactory high rate discharge.

BRIEF DESCRIPTION OF THE DRAWING

The invention will be more particularly understood by reference to the following detailed description of the preferred embodiments thereof, taken in conjunction with the accompanying drawing, wherein:

FIG. 1 is a photomicrograph showing a nickel fiber under 60 fold magnification;

FIG. 2 is a photomicrograph showing the cross-section of the nickel fiber under 250 fold magnification;

DESCRIPTION OF THE PREFERRED EMBODIMENTS

Figure 3:
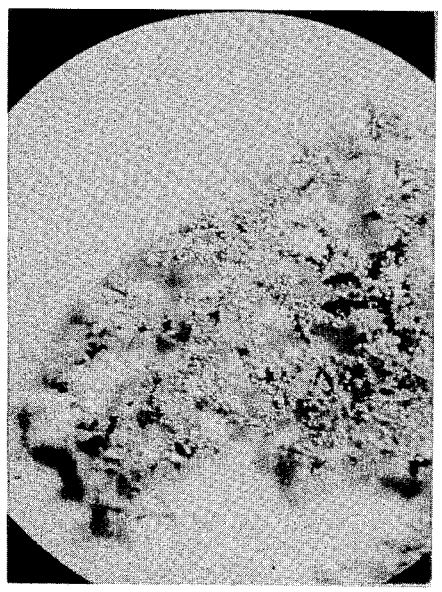
FIG. 3 is a photomicrograph showing an interconnected skeletal nickel fibrous mat under 20 fold magnification.

Referring to FIG. 1, there is shown a photomicrograph of a typical nickel fiber under 60 fold magnification. It will be readily seen that the individual nickel fiber shown in the photomicrograph consists essentially of a single elongated chain or cluster of small, interconnected nearly perfect spheres with a number of side growths, each having the same basic structure of the main fiber, i.e., each consisting of a single chain or cluster of small, interconnected spheres. The size of the spheres is of the order of about $3 \times 10^{-4}$ inch in diameter. FIG. 2 is a photomicrograph showing the cross-section of the nickel fiber under 250 fold magnification and illustrates in greater detail the configuration of the small, interconnected nearly perfect spheres. FIG. 3 is a photomicrograph under 20 fold magnification of an interconnected skeletal nickel fibrous mat. It will be seen from this photomicrograph that the mat is basically a skeletal structure of interconnected fibers joined to one or more neighboring fibers.

Figure 4:
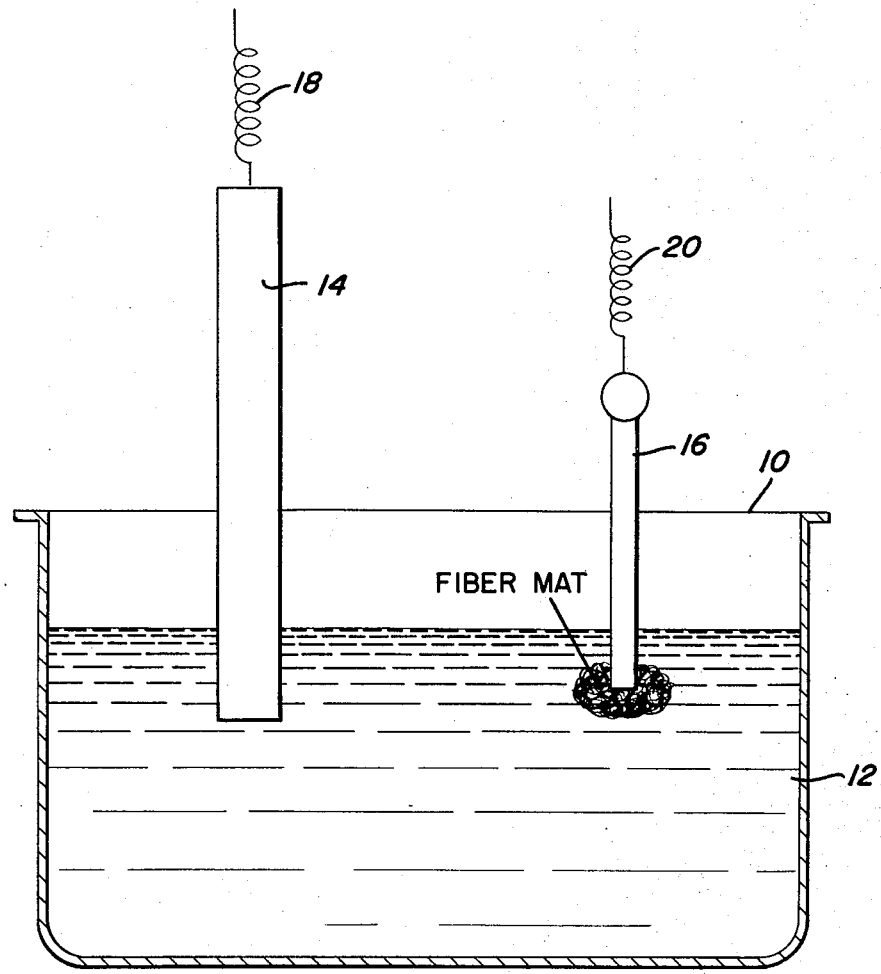
FIG. 4 is a schematic view of a typical electrolysis cell used for preparing the nickel fibers in accordance with the invention.

FIG. 4 shows schematically a typical electrolysis cell for preparing the nickel fibers in accordance with the invention. The cell consists of an open tank 10 which is approximately three-quarters filled with a soluble nickel salt-containing electrolyte bath 12. Suspended in the electrolyte bath 12 is a high purity nickel anode 14. A nickel wire cathode 16 is dipped just below the surface of the electrolyte bath 12.

In a practical cell, an array of multiple cathodes suspended within the electrolyte bath from a common bus bar may be used, there being only one cathode shown here for the purposes of illustration. The anode 14 and the cathode 16 are connected respectively through means of wires 18, 20 into an external circuit (not shown). The circuit includes a source of direct electrical current and means such as a rheostat for controlling the flow of electrical current through the cell.

To carry out the electroformation process of the invention, the external circuit is closed suitably by means of a switch and electrical current is allowed to flow through the cell. The anode is consumed during the electrolysis forming nickel ions in the electrolyte and depositing nickel at the cathode in accordance with the following reactions:

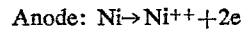
Anode: $Ni \rightarrow Ni^{++} + 2e$

Cathode: $Ni^{++} + 2e \rightarrow Ni$

Essentially all of the electrical current flowing through the cell is utilized in forming the nickel deposit. The cell electrolyte is invariant in that the anode is continuously replenishing nickel ions into the electrolyte as nickel ions are removed at the cathode.

From the earliest experimental work leading to the invention, it was recognized that one of the essential requirements for carrying out the electroformation process is the maintenance of extremely high cathode current densities. It has been found in accordance with the invention that the cathode current density should be maintained at about at least 500 amperes per square foot. This is considerably higher than that used in the conventional electroplating art for depositing smooth coatings of nickel from nickel sulfate-nickel chloride bath wherein a cathode current density of from about 10 to about 60 amperes per square foot have been reported (Electroplating Engineering Handbook by A. K. Graham, pages 210–211, Reinhold Publishing Company). Since the current density is inversely proportional to the cathode surface area for a given current, it is advantageous to employ a cathode of the smallest practical surface area exposed to the electrolyte and preferably a very thin nickel wire cathode is used. During the electroformation process, the nickel first deposits at the cathode in the form of individual fibers which may be easily broken off and then collected at the bottom of the electrolyte bath. If the process is allowed to proceed without removing the individual fibers, the electroformation will continue with more and more fibers being deposited on the initial growth at the cathode surfaces. This is believed due to the establishment on the surfaces of the previously formed fibers of points of higher current density. More fibers will continue to grow in this manner so long as sufficient electrical current is flowing through the cell, and eventually an interconnected skeletal nickel fibrous mat will be formed. This skeletal fibrous mat consists basically of multiple fibers joined to one or more neighboring fibers in the mat.

One the electroformation process has been started and the formation of the interconnected skeletal fibrous mat has begun, it may be necessary to periodically increase the flow of electrical current through the cell, such as by means of the rheostat, in order to meet the increased current requirements due to the increasingly greater number of fibers being deposited. It is virtually impossible during the electrodeposition process to determine the cathode current density with any degree of accuracy due to the rapidly changing surface area of the nickel deposits. However, the electroformation process may be expediently carried out by properly controlling the amount of electrical current flowing through the cell to provide an estimated cathode current density which is above the minimum requirement for the electroformation of the fibers. The proper range of cathode current density can be estimated simply by visual observation of the type of deposit or reaction occurring at the cathode. If the cathode current density is too low, no fiber deposit can be observed. The deposit in this instance will be of the level, adherent type or the powdery type. If the cathode current density is too high, gas evolution (hydrogen) will be readily observed.

In the practice of the invention, the electrolyte may contain any divalent nickel salt whose principal requirement is that it be soluble in a solvent of high dielectric constant resulting in a solution of sufficient ionic conductivity to permit the maintenance of at least the minimum cathode current density necessary for electroforming the nickel fibers of the invention.

Suitable soluble divalent nickel salts include the acetate, bromide, perchlorate, chloride, fluosilicate, formate, iodide, nitrate and sulfate. Suitable solvents for the nickel salt include water and organic solvents, notably alcohols such as methanol, ethanol and n-propanol. Cost and conductivity are the two most important factors upon which the choice of the nickel salt and solvent should be based. Nickel sulfate is the preferred choice for the nickel salt. An aqueous solution of nickel sulfate hexahydrate ($NiSO_4 \cdot 6H_2O$) is the most preferred electrolyte solution. Water is the preferred solvent because of its low cost and freedom from fire hazard and toxicity.

The concentration of the soluble nickel salt in the electrolyte solution should be fairly high in order to promote the electroformation process and to maintain a sufficiently high conductivity. A saturated aqueous solution of nickel sulfate hexahydrate has been used successfully.

To illustrate the practice of the invention, nickel fibers have been prepared using an electrolysis cell similar to that shown in FIG. 4 in which one thin nickel wire cathode of about .02 inch in diameter dipping approximately 0.2 inch into the electrolyte solution was used. The anode was also a nickel wire of .02 inch in diameter. The electrolyte was a saturated solution of nickel sulfate hexahydrate and the anode-to-cathode distance was about three inches. The electrolyte was maintained at about room temperature. Upon closing the electrical circuit, a current of about 16 milliameperes flowed through the cell and nickel was observed to electrodeposit at the cathode surfaces in the form of individual fibers. The fibers formed initially at the high current density edges of the cathode and could be easily broken off immediately as they were formed by scraping the surfaces of the cathode, the fibers then falling to the bottom of the electrolyte bath.

When the electrolysis was allowed to proceed without removing the fibers, more and more fibers were observed to electrodeposit from the surfaces of the fibers initially formed at the cathode and this process continued with each of the fibers joining to one or more neighboring fibers until an interconnected skeletal nickel fiber mat was produced. Eventually the weight of the fiber mat so produced caused it to be broken off from the cathode surfaces and the mat then fell to the bottom of the electrolyte bath. The process was continued to produce more fiber mat.

The nickel fibers prepared in the above example were relatively short fibers having a length of about one-thirtieth of an inch. Long fibers of about one-eighth inch in length have also been prepared.

Surface area measurements of the nickel fibers have been made using the krypton absorption BET[1] method. The fibers were found to possess a specific surface area of about 1.67 square meters per gram. Conventional nickel powder possesses a specific surface area within the range of from about 0.41 to about 0.156 square meter per gram. It will thus be seen that the nickel fibers have approximately three to ten times more surface area than does the conventional powder. One advantage of the nickel fibers is that they possess a high specific surface area but are not so highly developed in surface area as to be pyrophoric and subject to rapid oxidation when exposed to the atmosphere. Commercially available high surface area nickel can range anywhere from 10 square meters per gram up to as high as 50 square meters per gram. The latter figure is typical of Raney nickel which is pyrophoric unless given special treatment.

The fibers prepared in accordance with the invention are composed essentially of pure nickel. The electroformation process is accompanied by electropurification and the fibers so prepared are probably one of the purest forms of nickel obtainable within a reasonable economic framework.

The nickel fibers of the invention have been found to be an excellent material for fabricating galvanic cell electrodes and particularly rechargeable cathodes for use in secondary or rechargeable alkaline nickel-cadmium galvanic cells. The rechargeable cathodes may be readily fabricated using the nickel fibers by conventional compression molding techniques. The fibers are distributed within a suitable mold of the size and configuration desired and then compressed under a suitable pressure, say about 100 p.s.i. Before applying pressure, the fibers should be thoroughly intermingled with one another so that they are arranged in randomly orientated fashion within the mold with each of the fibers making contact with as many neighboring fibers as possible. It will be readily seen that the interconnected skeletal nickel fiber mats produced in accordance with the invention are most advantageous for use in this molding procedure. The fibers in the interconnected skeletal mat are electroformed in such a manner that they are joined to one or more neighboring fibers in the mat. Upon the application of pressure, the intermingled fibers readily interlock or interknit producing a compact of high strength and cohesiveness.

The rechargeable cathodes fabricated in the manner described above are in the discharged condition in that the electrochemically active material, i.e., nickel, is in the reduced rather than oxidized form and can be charged to the extent desired before assembly into a sealed cell. The cathodes can be placed in the desired state of charge suitably by formation cycling, that is, repeated charge and discharge in an alkaline electrolyte. During charging, the surface portions of the fibers are electro-oxidized to the required nickel oxide state. This may also be conveniently accomplished by dipping the fiber compact after fabrication into a bath composed of an aqueous solution of potassium hydroxide and then anodizing the fiber compact. Alternatively, the individual fibers may be electro-oxidized immediately after they are electroformed by removing the cathode from the electroforming bath, dipping the cathode with the fibers still deposited thereon into the potassium hydroxide bath, and anodizing the fibers. The oxidized fibers may then be fabricated into a cathode by compression molding in the manner described above.

Rechargeable nickel oxide cathodes prepared in accordance with the invention have been found to possess a number of advantages over cathodes of the prior art. They possess a high active surface area and therefore are capable of satisfactory high rate discharge. Moreover, the cathodes so prepared possess a high strength and cohesiveness and can support their own weight and consequently they do not require an electrochemically inert support such as a sintered metal plaque as used in the prior art.

In addition to using the nickel fibers of the invention as the electrochemically active material, the fibers may also serve as a carrier for the active material. Thus, rechargeable cathodes in the charged condition have been fabricated by blending the fibers with nickel oxide powder followed by compression molding the blend into a thin wafer type compact. In this electrode structure, the nickel fibers act both as a mechanical binder for the nickel oxide particles upon compression and also as the current collector for the nickel oxide electrode.

Cadmium electrodes for use in both primary and secondary galvanic cells such as primary and rechargeable silver-cadmium and rechargeable nickel-cadmium cells can also be fabricated in the same manner by blending the nickel fibers with cadmium powder and then compression molding the blend to form the electrode. The fibers act as a binder for the cadmium powder and also as a current collector for the electrode.

What is claimed is:

1. Stable, high surface area nickel fibers composed of a single elongated chain of small, interconnected, nearly

---

[1] BET method—Journal of American Chemical Society, vol. 60, p. 309, 1938, S. Brunauer, P. H. Emmett and E. Teller.

perfect spheres, the fibers having a length of from about one-thirtieth to about one-eighth inch, an average diameter of about one-thousandth of an inch and a specific surface area of about 1.67 square meters per gram.

References Cited
UNITED STATES PATENTS

| | | | |
|---|---|---|---|
| 793,077 | 6/1905 | Hubbell | 136—28 |
| 2,660,523 | 11/1953 | De Lollis | 75—82 |
| 3,156,556 | 11/1964 | Meddings et al. | 75—119 |
| 3,443,929 | 5/1969 | Kishi | 75—82 |
| 3,510,408 | 5/1970 | Murdock | 204—10 |

WINSTON A. DOUGLAS, Primary Examiner

C. F. LE FEVOUR, Assistant Examiner

U.S. Cl. X.R.

136—28; 204—10